March 15, 1966 TETSURO NAKAMURA 3,239,908

METHOD OF MAKING A SEMICONDUCTOR DEVICE

Filed July 3, 1962

INVENTOR
TETSURO NAKAMURA
BY

ATTORNEY 3,239,908
Patented Mar. 15, 1966

3,239,908

METHOD OF MAKING A SEMICONDUCTOR DEVICE

Tetsuro Nakamura, Tokyo, Japan, assignor to Nippon Electric Company Limited, Tokyo, Japan, a corporation of Japan Filed July 3, 1962, Ser. No. 207,242
Claims priority, application Japan, July 26, 1961, 36/26,869
3 Claims. (Cl. 29—25.3)

This invention relates to semiconductor devices and more particularly to an improved method of making the same.

In the field of solid state electronics, it is highly desirable to have a number of semiconductor elements of the form of a compound unitary structure. It is, however, extremely difficult and impractical to produce such a structure due to the nature of the manufacturing process by which semiconductors are made. Organic binding agents have been employed to form a plurality of elements into a unitary structure, however, it has been found that the use of such agents produce various deleterious effects. Among these are distortion and cracking due to the difference in thermal expansion between the element and the binding compound, deterioration of the characteristic of the individual semiconductor elements, and poor reliability resulting from evaporation from the binding agent.

Accordingly, it is an object of this invention to provide a new method of assembling individual semiconductive elements into a unitary structure which eliminates the above disadvantages.

One of the advantages of the invention is that each individual semiconductive element of the structure is subjected to the same atmospheric and thermal conditions and therefore any changes resulting from these factors will be more uniform from element to element.

Figure 1A:
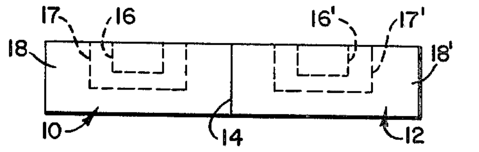
Figure 1B:
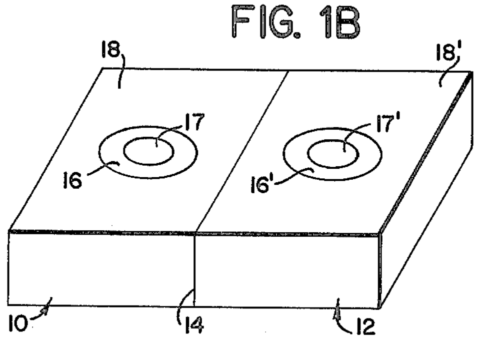
Figure 2A:
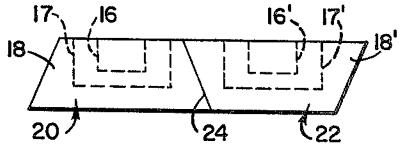
Figure 2B:
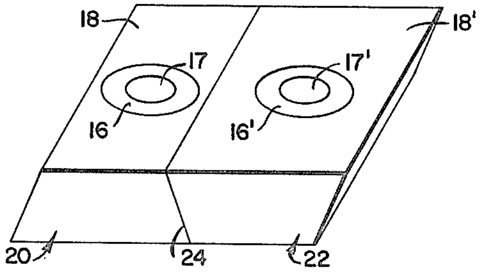
Figure 3A:
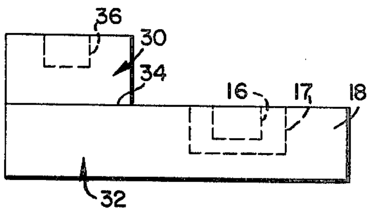
Figure 3B:
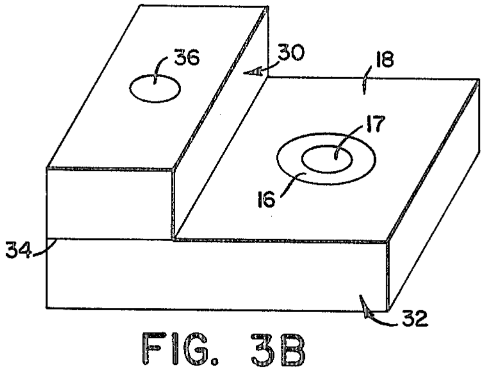

These and other objects, features and advantages of the invention will be best understood from the following description, taken in conjunction with the claims and the drawings in which:

FIGURES 1*a* and 1*b* and FIGURES 2*a* and 2*b* show embodiments of the invention in which two transistors are formed in a unitary structure with their common surfaces vertically and obliquely arranged, and FIGURES 3*a* and 3*b* is another embodiment in which a diode and a transistor are formed into a unitary structure.

In accordance with the invention, a plurality of semiconductive crystals or elements, individually made, are formed into a unitary structure through the medium of an insulating layer made between them. This layer is formed by a growing process of oxidation as the elements to be secured together are positioned adjacent one another in a controlled atmosphere.

Referring now to FIGURES 1*a* and 1*b*, there is shown a pnp type mesa transistor designated by the numeral 10, and an npn type mesa transistor, designated by the numeral 12. These two transistor crystals or elements are formed into a unitary structure, as shown in FIG. 1, wherein a side of one element is held in contact with a side of the other element, by means of a layer 14 which is an oxide of the material comprising the transistor elements, in this case silicon oxide. The numerals 16 and 16' designate emitter regions, numerals 17 and 17' designate base regions, and numerals 18 and 18' designate collector regions of the two transistors.

The transistors 10 and 12 may be formed into a unitary structure by positioning them adjacent one another and subjecting them to a temperature of approximately 650° C. for approximately one hour in an atmosphere of oxygen which has been saturated with steam or water vapor at 80° C. This produces the growth or formation of an insulating silicon oxide layer on all external surfaces of elements 10 and 12 and also forms the oxide binding layer 14, which causes the crystals 10 and 12 to adhere to each other, thus producing a unitary structure. I have found that this process does not adversely affect the characteristics or the position of the pn junction layer in the elements 10 and 12. Further, in the unitary structure produced, each element is capable of stable performance without interaction on the other element. Additionally, difficulties experienced in the prior art due to thermal expansion are eliminated since the oxide layer is formed from the element itself and has substantially the same thermal coefficient of expansion as the element.

Another method of producing the oxide binding layer 14 is to subject the elements to a temperature of approximately 1,000–1,200° C. in an atmosphere of oxygen for a period of approximately one hour, the oxygen first having been saturated with steam or water vapor at 80° C. In this case, however, the position of the pn junction may shift somewhat by reason of diffusion of active impurities because of the high heating temperature.

In the two methods of forming the common layer 14 described above, we have cited as examples treatment in an atmosphere of oxygen and saturated steam, however, it is also possible to produce satisfactory results without the use of steam.

FIGURES 2*a* and 2*b* show the form or shape generally employed for the elements, these being shown as 20 and 22, corresponding to the elements 10 and 12 in FIGURE 1, and bound together by the oxide layer 24.

FIGURE 3 illustrates a diode semiconductor element 30 secured to a surface of a transistor element 32 by means of a horizontal oxide binding layer 34. The numeral 36 indicates a pn junction layer of the diode.

By the use of the methods described above, a compact unitary structure is achieved which comprises a plurality of semiconductor elements held together by means of an oxide binding layer formed from portions of the elements in contact with one another.

Though the drawings and the explanation have referred to mesa-type elements, the invention is obviously applicable also to semiconductive elements of various types. Further, it is understood that the description is made only by way of example and is not to be deemed a limitation of the scope of the invention as set forth in the objects thereof and in the accompanying claims.

I claim:

1. The method of making a unitary semiconductor structure comprising the steps of
   - holding an n-type semiconductive element in adjacent relationship with a p-type semiconductive element,
   - subjecting said elements to an atmosphere of oxygen which has been saturated with steam at approximately 80° C.,
   - and heating said elements to a temperature of at least approximately 650° C. for approximately one hour while in said atmosphere, to thereby cause a bonding layer to grow between adjacent elements, said layer being formed of an oxide of at least one of said semiconductive elements.

2. The method of making a unitary structure comprising the steps of
   - placing at least two individual semiconductor elements of semiconductor material in closely spaced relationship with one another,
   - holding said elements in said closely spaced relationship,
   - heating said elements while so held to a temperature of at least approximately 650° C. for approximately one hour in an atmosphere of oxygen which has been substantially saturated with water vapor at approximately 80° C., to form a bonding layer between said elements which is formed of an oxide of said material and which has a thermal coefficient of expansion substantially the same as said material, whereby said elements are formed into a compound unitary structure in which each element is capable of stable electrical performance without producing substantial electrical interaction on the adjacent element.

3. The method of making a unitary structure of silicon semiconductor material in accordance with the steps set forth in claim 2.

References Cited by the Examiner

UNITED STATES PATENTS

| | | | |
|---|---|---|---|
| 2,990,500 | 6/1961 | Mierendorf | 317—101 |
| 2,995,686 | 8/1961 | Selvin | 317—101 |
| 2,996,799 | 8/1961 | Gaul | 29—502 |
| 3,006,067 | 10/1961 | Anderson | 29—494 |
| 3,050,843 | 8/1962 | Margolis | 29—470 |
| 3,091,849 | 6/1963 | Cohen | 29—494 |

OTHER REFERENCES

Publication: Transistor Technology Biondi, volume III, pages 70–72, 75, 76, TK 7872.T73–B45t, 1958.

RICHARD H. EANES, Jr., *Primary Examiner.*